Sept. 23, 1952        R. D. ACTON        2,611,305
IMPLEMENT CONTROL FOR TRACTOR-CONNECTED IMPLEMENTS
Filed Nov. 18, 1946
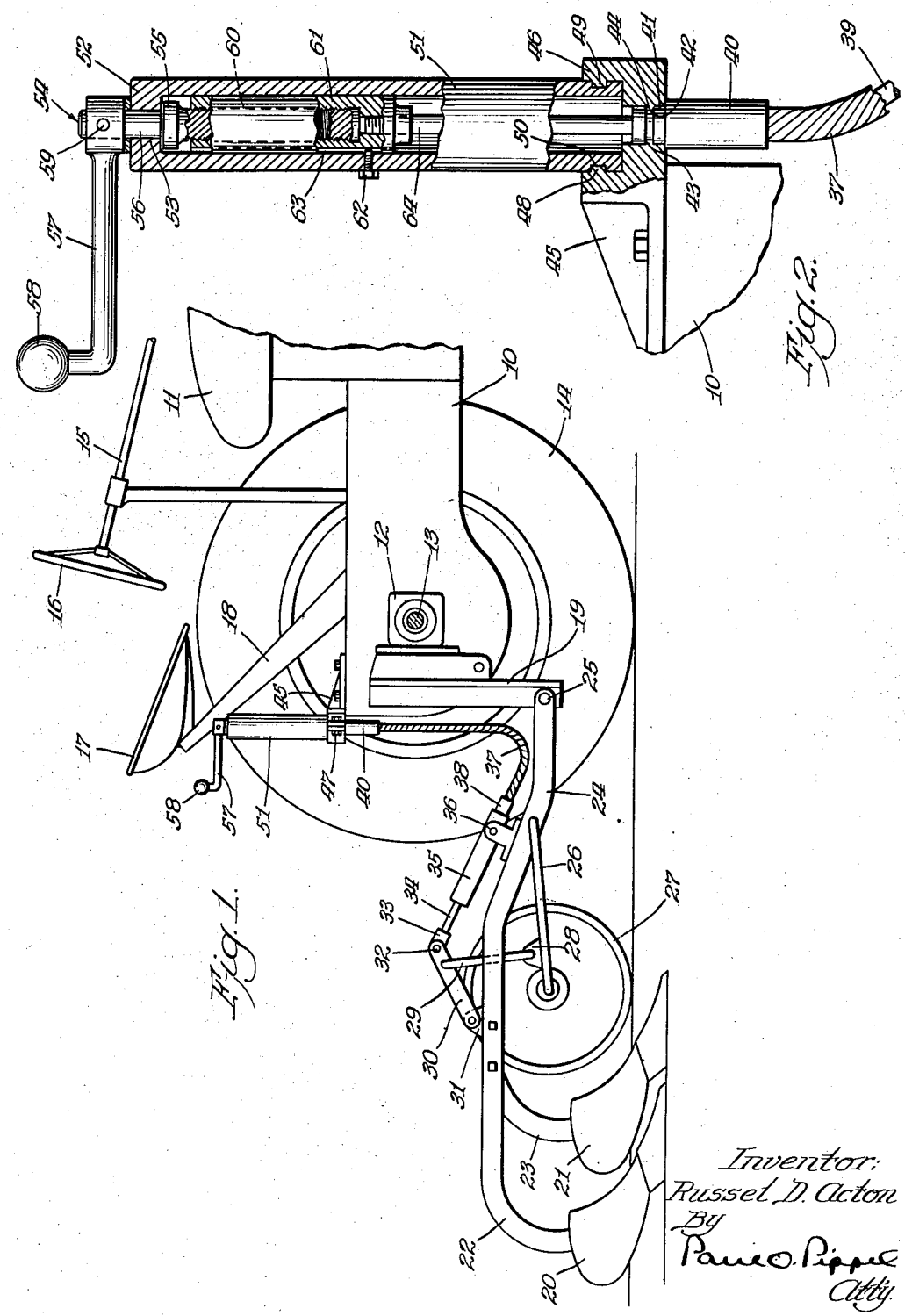
Inventor:
Russel D. Acton
By
Paul O. Pippel
Atty.

Patented Sept. 23, 1952

2,611,305

UNITED STATES PATENT OFFICE 2,611,305

IMPLEMENT CONTROL FOR TRACTOR-CONNECTED IMPLEMENTS

Russel D. Acton, Chicago, Ill.

Application November 18, 1946, Serial No. 710,612

8 Claims. (Cl. 97—47)

This invention relates to an implement control for tractor connected implements. More specifically, it relates to a mechanism for manually applying adjusting power from a station on a tractor to an implement flexibly connected to the tractor in trail-behind position.

There has been a growing trend to supply adjusting means for tractor drawn implements which may be controlled from the operator's station on the tractor. Due to the fact that many such implements are flexibly connected to a draft structure on the tractor it has been difficult to utilize ordinary make linkages due to the fact that the adjustments are disrupted by floating or pivoting movement of the implement with respect to the tractor. It has also been proposed to use hydraulic means whereby flexible hoses may transmit the power from the tractor to the implement. Such devices are satisfactory but require expensive equipment such as a pump and high pressure hoses, particularly when it is desired to transmit adjusting power in two directions. A simplified push-pull construction has been developed utilizing a flexible power transmitting element included in a flexible conduit. This construction is disclosed in my co-pending application Serial No. 681,336, filed July 3, 1946.

The principal object of the present invention is to provide manual control means for a flexible push-pull power transmitting device. A more specific object is to provide a screw arrangement adjacent an operator's station on a tractor whereby power may be applied in two directions through a flexible power transmitting device to an implement drawn behind the tractor.

Another object is to provide a manual adapter for a flexible power transmitting device ordinarily used in connection with a source of power.

According to the construction disclosed in my identified co-pending application a tractor is supplied with power operated means for providing reciprocating power in two directions. This power is then applied through a flexible power transmitting device utilizing a flexible cable for transmitting adjusting power in two directions to a trailing implement. It is quite likely that if such devices come into wide use some users may not find it possible to buy an implement and use it with their present tractor which may not have a source of reciprocating power thereon. It is therefore highly desirable that a manual adapter be provided whereby such a power controlled implement may be used with any tractor.

As disclosed in the drawings, the rear portion of a conventional tractor is shown, said tractor having rear body portion 10, a fuel tank 11, laterally extending rear axle housings 12, one of which is visible, drive axles 13 projecting from said housings, one of which is visible shown in section, and traction wheels 14, one of which is shown, the other being removed to better show the adjusting construction of the invention and its mounting on the tractor. A steering column 15 is also shown on which a steering wheel 16 is mounted adjacent an operator's station 17 carried by a supporting structure 18.

A draft structure indicated in its entirety by the reference character 19 is secured to the axle housing structure 12 extending downwardly at the rear of the tractor to provide a hitch point for an implement. The implement diagrammatically indicated includes plow bottoms 20 and 21 mounted respectively on beams 22 and 23. Said beams are connected in a conventional manner to a forwardly extending draft structure 24 which is pivotally connected at 25 to the draft structure 19 on the tractor. A linkage 26 pivotally connected to the draw bar structure 24 carries a gauge wheel 27 positioned to accurately gauge the working depth of the plow bottoms 20 and 21. A bracket 28 on the linkage 26 is connected by a link 29 to a lever 30 pivoted on a bracket 31 mounted on a plow draw bar structure 24.

The lever 30 is pivotally connected at 32 to a fitting 33 secured to one end of a plunger member 34 mounted for reciprocation in a cylindrical guide member 35. Said guide member is pivotally supported on a bracket 36 secured at an upward location on the draw bar structure 24.

A flexible conduit 37 is connected to a fitting 38 at the forward end of the member 35. Said conduit serves as a seat for a flexible power transmitting member 39 slidably mounted therein and adapted to be connected in a conventional manner to the plunger member 34 within the cylindrical guide member 35.

The flexible conduit 37 is also connected at its other end to a fitting 40 which has a reduced head portion 41 provided with an annular recess 42. Said recess forms means whereby metal annular ridges or projections 43 and 44 formed respectively on a tractor mounted member 45 and a clamping member 46 may firmly engage and hold said fitting. The member 45 is firmly fastened to the upper rear portion of the tractor body 10. The clamping member 46 is secured by bolts 47 at both sides as shown in one side in Figure 1 to the member 45.

The members 45 and 46 are also formed respectively with annular ridges or projections 48 and 49 which are adapted to engage a recess 50 formed in a cylindrical casing 51. It will be understood that the clamp member 46 securely clamps the fitting 40 and the casing 51 in a substantially dust-tight manner.

The casing 51 has a closed upper end 52 through which a bore 53 extends. A power applying member indicated in its entirety by the reference number 54 has a shoulder portion 55 abutting the inside surface of the upper end 52 of the casing 51. Said member also has a shaft-like extension 56 of a reduced diameter rotatably extending through the bore 53. An operating lever or crank 57 having a ball 58 formed thereon for easy operation by the hand of the tractor operator is secured by a pin 59 to the projecting end of the extension 56. Within the casing 51 the member 54 has a long threaded extension 60 which is threaded into a sleeve-like member 61 mounted for reciprocation in the casing 51 and held against rotation therein by a pin 62 extending through the wall of the casing 51 into sliding engagement in a slot or recess 63 formed throughout the entire member 61. It will be understood by rotation of the crank 57 the member 61 may be reciprocated from one end to the other within the casing 51.

The flexible power transmitting member 39 is suitably secured to a rod-like extension 64 which projects from the fitting 40 into the casing 51. Said extension is threaded into the lower end of the member 61 for movement therewith.

The operation of the power transmitting device constituting applicant's invention has been explained in connection with the description of the parts thereof. An operator on the station 17 by reaching down to the crank 57 may accurately adjust the position of the gauge wheel 27 in either direction thereby adjusting the working depth of the plow. There is no lost motion at any point in the device thereby giving a very accurate and sensitive control within easy reach of the operator. Due to the flexible nature of the conduit 37 and the flexible power transmitting element 39 therein the implement may float and pivot with respect to the tractor without in any way affecting to the slightest extent the adjustment of the gauge wheel 27 relative to the draw bar structure 24 of the plow.

It is to be understood that applicant has shown and disclosed only a preferred embodiment of his device for transmitting power to implements flexibly connected to tractors and he claims as his invention all modifications falling within the scope of the appended claims.

What is claimed is:

1. For tractor - implement combinations in which the implement has a movable working member thereon requiring adjustment during operation of the implement, an adjusting device comprising a guide member adapted to be secured to a portion of the tractor-implement combination, a plunger member slidably mounted in said member and adapted to be connected to said movable working member, a bracket structure adapted to be mounted on the tractor, a recess formed in said bracket member, a clamping member adapted to be secured over said recess, a second guide member to which the other end of the conduit is connected, said guide member and said bracket and cover members having interlocking projections to rigidly secure the guide member, a hollow housing structure having an end portion secured to said bracket by the clamping member in alignment with the guide member, a plunger member mounted in the second guide member, a piston member mounted for reciprocation in the housing structure and held against rotation therewith, said member being secured to the plunger member, an adjusting member extending into the housing structure and being connected by threading to said piston member, said adjusting member being held against axial movement with respect to the housing structure, and crank means secured to said adjusting member for rotating it in either direction and thereby reciprocating the plunger member to adjust the implement at will.

2. For tractor - implement combinations in which the implement is floatingly connected to the tractor and has a movable working member thereon requiring adjustment during operation of the implement, an adjusting device comprising a guide member adapted to be secured to the implement, a plunger member slidably mounted in said member and adapted to be connected to said movable working member, a bracket structure adapted to be mounted on the tractor, a recess formed in said bracket member, a clamping member adapted to be secured over said recess, a second guide member to which the other end of the conduit is connected, said guide member and said bracket and cover members having interlocking projections to rigidly secure the guide member, a hollow housing structure having an end portion secured to said bracket by the clamping member in alignment with the guide member, a plunger member mounted in the second guide member, a piston member mounted for reciprocation in the housing structure and held against rotation therewith, said member being secured to the plunger member, an adjusting member extending into the housing structure and being connected by threading to said piston member, said adjusting member being held against axial movement with respect to the housing structure, and crank means secured to said adjusting member for rotating it in either direction and thereby reciprocating the plunger member to adjust the implement at will.

3. For tractor - implement combinations in which the implement has a movable working member thereon requiring adjustment during operation of the implement, an adjusting device comprising a guide member adapted to be pivotally secured to a portion of the tractor-implement combination, a flexible conduit connected to said guide member, a bracket structure adapted to be secured to the tractor implement combination, a second guide member to which the other end of the conduit is connected, a clamping member adapted to rigidly secure said second guide member to said bracket structure, a housing structure having an open end portion and a closed end portion, said open end portion being secured to said bracket structure, a piston member mounted for reciprocation in the housing structure and held against rotation therewith, a flexible push-pull power transmitting element within the flexible conduit and adapted to be connected to the movable working member on the implement and to the piston member in the housing structure, an adjusting member extending into the housing structure from the closed end and being threaded in said piston member, said adjusting member having abutments provided within and outside said housing structure to hold the adjusting member against axial movement while providing for rotation, and a manual crank means secured to said adjusting member for rotating it in either direction and thereby reciprocating the cable in the conduit to adjust the working member on the implement.

4. For tractor-implement combinations in which the implement is floatingly connected to the tractor and has a movable working member thereon requiring adjustment during operation of the implement, an adjusting device comprising a guide member adapted to be pivotally secured to the implement, a flexible conduit connected to said guide member, a bracket structure adapted to be mounted on the tractor, a second guide member to which the other end of the conduit is connected, a clamping member adapted to rigidly secure said second guide member to said bracket structure, a housing structure having an open end portion and a closed end portion, said open end portion being secured to said bracket structure, a piston member mounted for reciprocation in the housing structure and held against rotation therewith, a flexible push-pull power transmitting element within the flexible conduit and adapted to be connected to the movable working member on the implement and to the piston member in the housing structure, an adjusting member extending into the housing structure from the closed end and being threaded in said piston member, said adjusting member having abutments provided within and outside said housing structure to hold the adjusting member against axial movement while providing for rotation, and a manual crank means secured to said adjusting member for rotating it in either direction and thereby reciprocating the cable in the conduit to adjust the working member on the implement.

5. For tractor-implement combinations in which the implement is floatingly connected to the tractor and has a movable working member thereon requiring adjustment during operation of the implement, an adjusting device comprising a guide member adapted to be secured to the implement, a plunger member slidably mounted in said member and adapted to be connected to said movable working member, a flexible conduit connected to said guide member, a flexible element in said conduit secured to said plunger member, a bracket structure adapted to be mounted on the tractor, a recess formed in said bracket member, a clamping member adapted to be secured over said recess, a second guide member to which the other end of the conduit is connected, said guide member and said bracket and cover members having interlocking projections to rigidly secure the guide member, a hollow housing structure having an end portion secured to said bracket by the clamping member in alignment with the guide member, a plunger member mounted in the second guide member and secured to the flexible member therein, a piston member mounted for reciprocation in the housing structure and held against rotation therewith, said member being secured to the plunger member, an adjusting member extending into the housing structure and being connected by threading to said piston member, said adjusting member being held against axial movement with respect to the housing structure, and crank means secured to said adjusting member for rotating it in either direction and thereby reciprocating the cable in the conduit to adjust the implement at will.

6. For tractor-implement combinations in which the implement has a movable working member thereon requiring adjustment during operation of the implement, an adjusting device comprising a supporting structure secured to a portion of the tractor implement combination, a guide member adapted to be pivotally secured to said structure, a plunger member slidably mounted in said guide member, said plunger member being adapted to be connected to the working member of the implement, a flexible conduit secured to said guide member, a bracket structure adapted to be mounted on the tractor, a generally semi-cylindrical recess formed in said bracket member, a clamping member adapted to be secured over said recess, said member having a mating generally semi-cylindrical recess, a second guide member to which the other end of the conduit is connected, said guide member and said bracket and cover members having interlocking projections to rigidly secure said guide member and to hold it against movement in an axial direction, a hollow housing structure having an open end portion interlocked in said recesses in the bracket member and its cover to rigidly secure said housing structure against axial movement, a plunger member mounted in said second guide member, said conduit being constructed to confine a pressure transmitting medium for transmitting pressure from one plunger member to the other, a piston member mounted for reciprocation in the housing structure and held against rotation therewith, said member being secured to the last named plunger member, an adjusting member extending into the housing structure and being threaded in said piston member, the adjusting member having abutments provided within and outside said housing structure to hold said member against axial movement while providing for its rotation, and crank means secured to said adjusting member for rotating it in either direction and thereby reciprocating the plunger members to adjust the movable implement member at will.

7. For tractor-implement combinations in which the implement is floatingly connected to the tractor and has a movable working member thereon requiring adjustment during operation of the implement, an adjusting device comprising a supporting structure secured to the implement, a guide member adapted to be pivotally secured to said structure, a plunger member slidably mounted in said guide member, said plunger member being adapted to be connected to the working member of the implement, a flexible conduit secured to said guide member, a flexible element in said conduit secured to said plunger member, a bracket structure adapted to be mounted on the tractor, a generally semi-cylindrical recess formed in said bracket member, a clamping member adapted to be secured over said recess, said member having a mating generally semi-cylindrical recess, a second guide member to which the other end of the conduit is connected, said guide member and said bracket and cover members having interlocking projections to rigidly secure said guide member and to hold it against movement in an axial direction, a hollow housing structure having an open end portion interlocked in said recesses in the bracket member and its cover to rigidly secure said housing structure against axial movement, a plunger member mounted in said second guide member and secured to the flexible member therein, a piston member mounted for reciprocation in the housing structure and held against rotation therewith, said member being secured to the last named plunger member, an adjusting member extending into the housing structure and being threaded in said piston member, the adjusting member having abutments provided within and outside said housing structure to hold said member against axial movement while providing for its rotation, and crank means secured to said adjusting member for rotating it in either direction and thereby reciprocating the cable in the conduit to adjust the movable implement member at will.

8. For tractor-implement combinations in which the implement has a movable working member thereon requiring adjustment during operation of the implement, an adjusting device comprising a guide member adapted to be pivotally secured to a member of the tractor-implement combination, a flexible conduit connected to said guide member, a bracket structure adapted to be secured to a member of the tractor-implement combination, a second guide member to which the other end of the conduit is connected, a clamping member adapted to rigidly secure said second guide member to said bracket structure, a housing structure having an open end portion and a closed end portion, said open end portion being secured to said bracket structure, a piston member mounted for reciprocation in the housing structure and held against rotation therewith, a flexible push-pull power transmitting element within the flexible conduit and adapted to be connected to the movable working member on the implement and to the piston member in the housing structure, an adjusting member extending into the housing structure from the closed end and being threaded in said piston member, said adjusting member having abutments provided within and outside said housing structure to hold the adjusting member against axial movement while providing for rotation, and a manual crank means secured to said adjusting member for rotation in either direction to thereby reciprocate the cable in the conduit to adjust the working member on the implement.

RUSSEL D. ACTON.

REFERENCES CITED

The following references are of record in the file of this patent:

UNITED STATES PATENTS

| Number | Name | Date |
|---|---|---|
| 1,072,439 | Duryea | Sept. 9, 1913 |
| 1,835,631 | Bradley | Dec. 8, 1931 |
| 1,925,306 | Dean | Sept. 5, 1933 |
| 2,287,479 | Kelsey | June 23, 1942 |
| 2,410,918 | Acton | Nov. 12, 1946 |

FOREIGN PATENTS

| Number | Country | Date |
|---|---|---|
| 108,038 | Australia | July 19, 1939 |
| 95,871 | Austria | Jan. 25, 1924 |